S. T. VOLL.
AUTOMATIC LUBRICATOR.
APPLICATION FILED JULY 30, 1919.
1,367,107.
Patented Feb. 1, 1921.
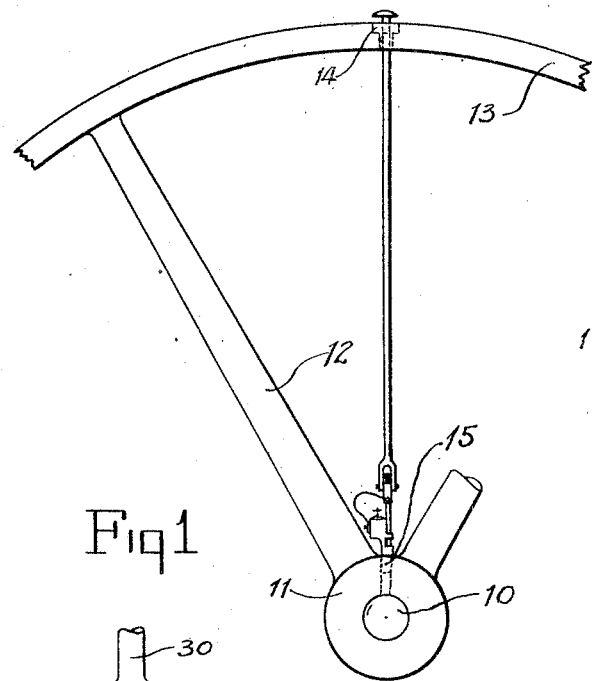
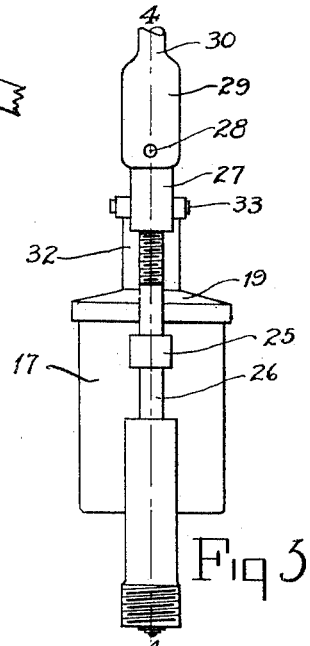
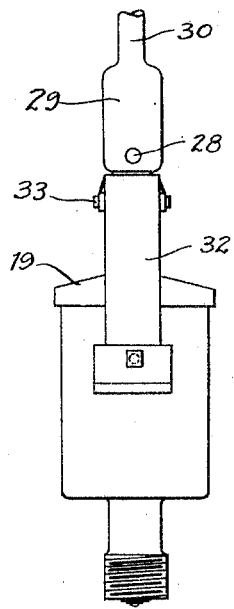
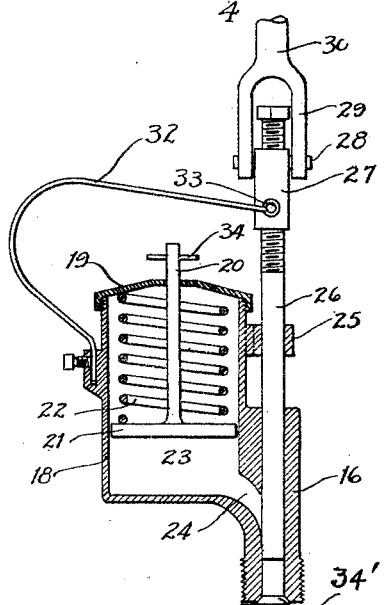
Inventor
Samuel T Voll

UNITED STATES PATENT OFFICE.

SAMUEL T. VOLL, OF HARB, MONTANA.

AUTOMATIC LUBRICATOR.

1,367,107.     Specification of Letters Patent.     Patented Feb. 1, 1921.

Application filed July 30, 1919. Serial No. 314,314.

*To all whom it may concern:*

Be it known that I, SAMUEL T. VOLL, a citizen of the United States, residing at Harb, in the county of Phillips, State of Montana, have invented certain new and useful Improvements in Automatic Lubricators; and I do hereby declare the following to be a full, clear, and exact description of the invention, such as will enable others skilled in the art to which it appertains to make and use the same.

This invention relates to new and useful improvements in oiling devices and particularly to devices for oiling bearings of shafts or other rotating parts.

One object of the present invention is to provide a novel and improved device of this character whereby lubricant is supplied to the moving part only at intervals in the rotation of such part and not continuously as is done with lubricating devices heretofore.

Another object is to provide a novel and improved device of this character wherein the amount of lubricant delivered to the bearing can be easily and properly regulated.

Other objects and advantages will be apparent from the following description when taken in connection with the accompanying drawing.

In the drawing:

Figure 1 is an elevation of a wheel and axle, showing the application of my improved lubricating device.

Fig. 2 is an enlarged elevation of the oiling device viewed from the left in Fig. 1.

Fig. 3 is an enlarged elevation of the oiling device viewed from the right in Fig. 1.

Fig. 4 is a vertical sectional view taken centrally through the lubricating device, on the line 4—4 of Fig. 3, to show the interior construction of the lubricant holder and the manner in which the lubricant is delivered therefrom.

Referring particularly to the accompanying drawing, 10 represents the shaft, 11 the hub of a wheel, 12, the spokes thereof, and 13 the rim of the wheel, in connection with which my invention is particularly adapted for use. Through the rim of the wheel there is formed an opening 14, the purpose of which will presently appear. In the hub, in direct radial alinement with the opening 14, is formed an internally threaded opening 15, which communicates with the external face of the portion of the shaft within said hub.

Threaded into the opening 15 is the inner end of the hollow stem 16 of a casting 17, said casting also including the hard oil cup 18. Removably engaged on the upper end of the cup is a centrally apertured cap 19 through which the stem 20 of the plunger 21 is slidably disposed. A coil spring 22 is disposed in encircling relation with the stem 20, within the cup, and has its ends bearing against the inner face of the cap and the upper face of the plunger, whereby said plunger is normally urged downwardly onto the solid lubricant within the chamber 23 of the cup, and below the said plunger. In one side of the lower end of the cup there is formed an outlet opening 24 which communicates with the bore of the hollow stem 16, said opening being formed to extend in a downwardly inclined direction to cause the lubricant to flow downwardly into the said bore, when pushed by the plunger 21. On the side of the cup, directly above the upper end of the bore of the stem 16, there is formed a guide eye 25, in which is slidably disposed the plunger stem 26. The lower portion of this stem 26 is disposed for slidable movement in the said bore past the opening 24 to force such lubricant downwardly through said bore, and out through the lower end thereof, to the shaft 10, as is forced into the bore by the plunger 21. The upper end of the stem 26 is screwed into the lower end of the block 27, said block being formed with the two oppositely directed trunnions 28 which are engaged in the apertured ends of the fork 29 of the lower end of the operating rod 30. The outer end portion of this rod extends through the opening 14 in the rim of the wheel, where it is provided with a head for contact with the ground, as the wheel rotates.

Secured to the side of the cup, opposite to the eye 25, is one end of a bowed spring 32, the same extending upwardly and over the upper end of the cup, where its other end is engaged with a lug 33 on the block 27. When the stem 26 descends the spring 32 is compressed and the lubricant in the bore of the stem 16 is forced out of the bore onto the shaft. Thus at each revolution of the wheel the operating rod contacts with the ground and is pushed inwardly with the result that the stem 26 is moved in the bore to discharge a certain quantity of lubricant to the shaft. The amount of lubricant discharged by the stem 26 can be regulated by screwing the stem into or out of the block 27, whereby the stroke of said stem can be shortened or lengthened.

The outer end of the stem 20 is provided with a transverse handle member 34 by means of which the said stem can be manipulated when desired.

The present device is especially adapted for feeding hard or solid lubricant to moving parts and feeds intermittently. In devices heretofore the lubricant is under pressure and is forced toward the moving part continuously thus wasting a large quantity of lubricant, as the moving part does not need a continuous supply, but needs time in which to consume such quantity as is fed to it. When the lubricant is fed continuously the excess overflows and is lost. With the present device a quantity of lubricant, predetermined by the adjustment of the stem 26, is fed to the moving part only once in each complete revolution of the wheel, that part which has been fed having time to spread around the shaft before the next quantity is delivered to it.

In the lower end of the bore of the hollow stem 16 there is mounted a spring pressed check valve 34' which prevents the outflow of the lubricant to the bearing until the plunger 26 descends. When the plunger descends the lubricant will be forced downwardly so as to open the valve and permit the lubricant to pass to the bearing, but when the plunger rises this valve closes and a partial vacuum is formed in the bore of the stem until the opening is uncovered, and then the lubricant rushes into the bore to fill such vacuum.

What is claimed is:

1. In a lubricator, the combination with a tubular stem for attachment to the point to be lubricated, a check valve over its outlet end closing inwardly, and a plunger in its bore for movement toward and from said valve; of a container for lubricant offset laterally from said stem and having an outlet opening communicating with its bore and across which opening said plunger moves, and means in said container for exerting constant pressure on the lubricant therein.

2. In a lubricator, the combination with a tubular stem for attachment to the point to be lubricated, a check valve over its outlet end closing inwardly, and a plunger in its bore for movement toward and from said valve; of a grease cup offset laterally from the stem and having an outlet opening communicating with its bore at a point above said check valve and across which the lower end of the plunger moves, and means within said cup for exerting constant pressure on the grease contained therein.

3. In a lubricator, the combination with a tubular stem, a grease cup laterally offset therefrom and having an outlet opening leading into the bore of the stem, a spring-pressed plunger within said cup urging grease constantly toward said outlet, and a spring-pressed valve at the outlet of the stem for resisting the escape of grease under pressure of its plunger; of a second plunger mounted for movement in the bore of the stem across said outlet opening, and means for reciprocating this plunger at times.

4. The combination with a wheel having a hub mounted on an axle and a rim having an opening therethrough, of a lubricant container mounted on the hub and having an offset stem whose bore leads to the axle and an outlet opening leading into said bore, a plunger movable in said bore, means in the container for constantly forcing lubricant through the outlet and into said bore, a rod leading through the rim opening in position to be pushed inwardly by contact with the ground at each rotation of the wheel, and adjustable connections between said rod and the plunger whereby the stroke of the plunger is capable of adjustment to regulate the amount of lubricant discharged.

In testimony whereof I affix my signature in the presence of two witnesses.

SAMUEL T. VOLL.

Witnesses:
E. W. RUNGE,
G. F. THOMPSON.